May 24, 1960

R. F. PIERCE 2,937,402

APPARATUS FOR PRODUCING FILM

Filed Jan. 6, 1956

INVENTOR.
Russell F. Pierce
BY
Harry H. Levin
Attorney

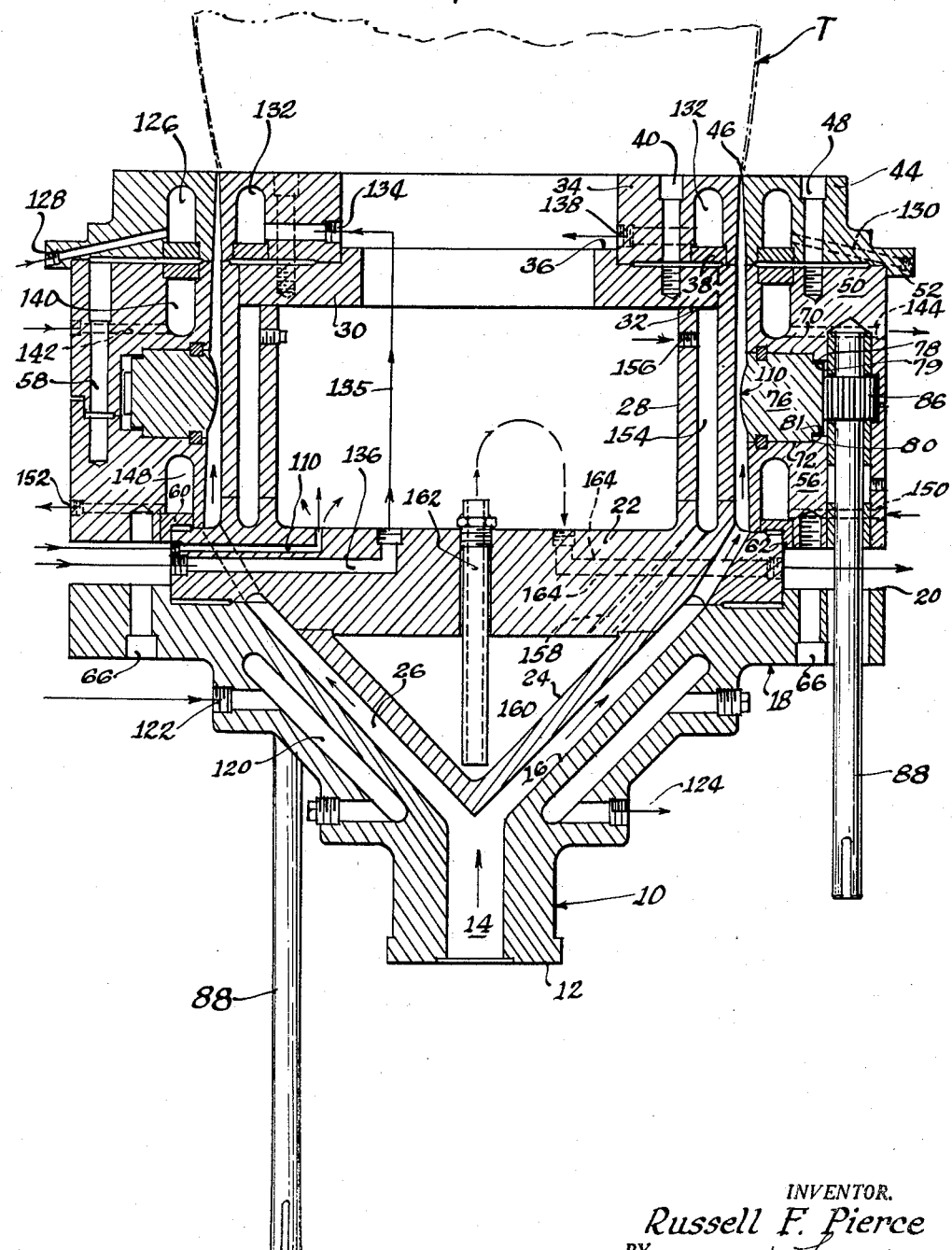

United States Patent Office 2,937,402
Patented May 24, 1960

2,937,402
APPARATUS FOR PRODUCING FILM

Russell F. Pierce, Terre Haute, Ind., assignor, by mesne assignments, to Union Carbide Corporation, a corporation of New York Filed Jan. 6, 1956, Ser. No. 557,762

8 Claims. (Cl. 18—14)

This invention relates to extruding thermoplastic materials. More particularly it relates to a new and improved apparatus for extruding thermoplastic tubing, as well as the product resulting therefrom.

In a method of producing flattened seamless self-sustaining tubing, a thermoplastic composition was melt-extruded through an annular orifice in the form of a seamless tubing and as the tubing was being withdrawn from the die and while it was in the plastic formative state, it was inflated to a predetermined diameter. After setting, the tubing was collapsed and wound-up. Preferably the tubing, as it was being withdrawn, or at some later time prior to flattening was cooled, as for example, by the application of a gaseous cooling medium to the exterior peripheral wall surface of the tubing. For convenience, the aforementioned method is herein referred to as "the blown tube method."

The apparatus for carrying out the aforementioned blown tube method included a die having an annular orifice and comprising a cup and a core arranged to provide a passage therebetween through which the heated thermoplastic composition was fed to the die orifice. Means were also provided to supply the inflating medium. The cup and core were disposed on a spider whose legs were positioned on a die holder. The legs of the spider were in the flow path of the thermoplastic to the die orifice. Usually a screen was also disposed in the flow path of the thermoplastic. The parting of the thermoplastic as it passed the screen and legs of the spider and the subsequent union of the thermoplastic after passing each of these elements resulted in fusion lines sometimes called memory lines. These fusion lines caused variation in caliper of the film and sometimes reappeared in the film.

An object of the invention is to provide an apparatus for producing film free of fusion lines.

Other and additional objects will appear hereafter.

The above objects are accomplished in general by homogenizing the heated thermoplastic composition in tubular form prior to its delivery to the die orifice and after it has passed all elements parting the composition.

The means for homogenizing the thermoplastic composition comprises a rotating mixing element carried by the cup of the die. In one form, the cup is formed of a plurality of sections and one of them constitutes the mixing element, as will appear hereafter.

The nature of the invention and the manner in which it may be practiced will become clear from the following detailed description when taken in conjunction with the accompanying drawings forming a part of this specification and wherein Figure 1 is a schematic arrangement of an apparatus embodying the principles of the invention;

Figure 3 is a section taken on line 3—3 of Figure 2.

Figure 1:
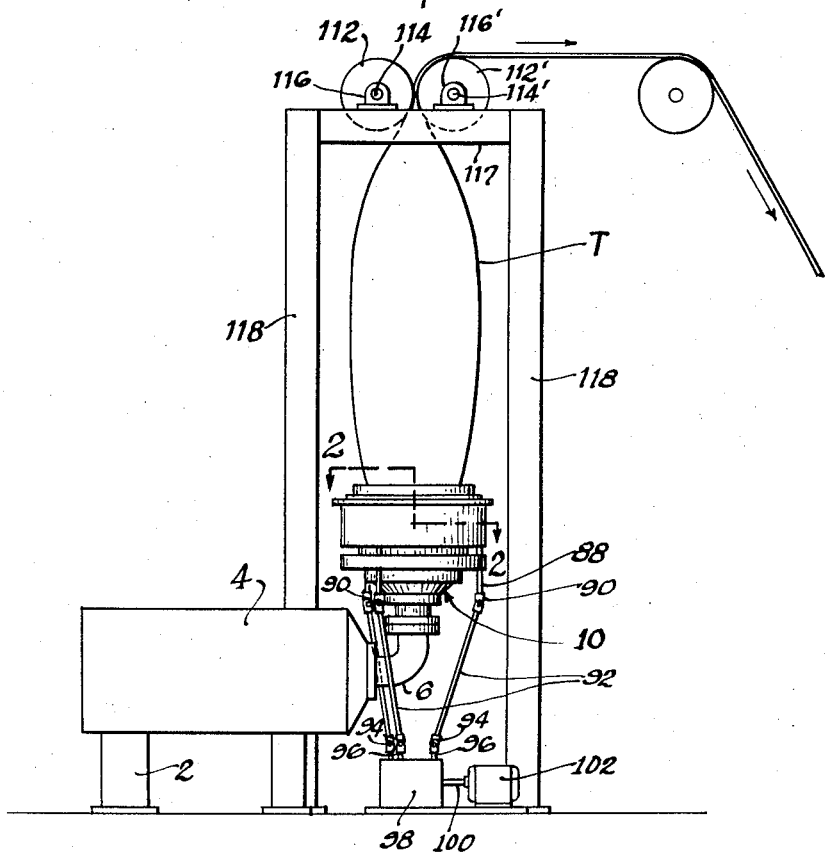
Figure 2:
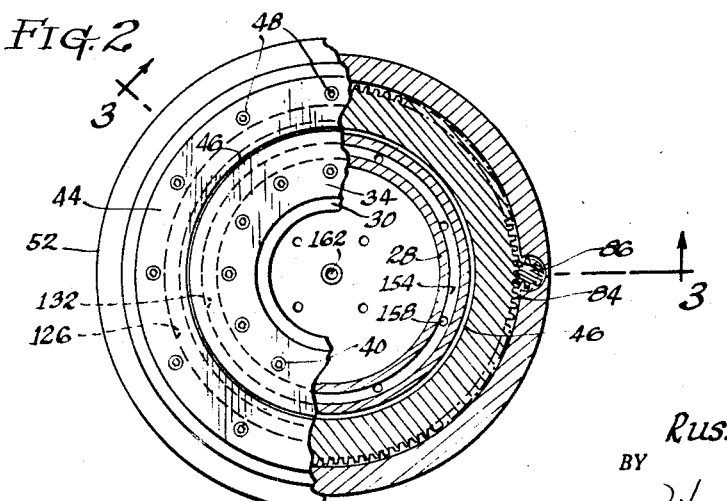
Figure 2 is a section taken on lines 2—2 of Figure 1.

Referring now to the drawings, wherein like reference numerals designate like parts, the reference numeral 2 designates a support carrying an extruder 4, of known construction, adapted to deliver a solid mass of molten thermoplastic to a 90° elbow 6 appropriately secured thereto. A die holder 10 is secured to the delivery end of elbow 6. As shown in Figure 3, die holder 10 is provided with a passage 14 from which the solid mass of thermoplastic composition, delivered from the extruder, passes to and through the die, as will become apparent hereafter. As shown in Figure 3, the inner wall 16 of the die holder beyond the passage 14 flares outwardly in the upward direction.

The upper end of the die holder 10 is formed with a horizontal outwardly extending flange 18, having a peripheral shoulder 20 which cooperates with the free ends of radially extending equidistantly spaced legs 22 of a spider and serves to position the spider in place on the die holder 10. Since the legs 22 are in the flow path of the composition, the latter will be parted as it passes such legs and thereafter will be united.

A hollow conical shaped distributor 24 is secured to the bottom of the spider and its outer wall surface is spaced from the inner wall 16 of the die holder 10 to provide an upwardly extending passage 26 whereby the solid thermoplastic composition is formed into a tubular mass and fed to the die.

The die comprises a hollow cylindrical core 28, the lower end of which is integrally secured to the spider legs 22 as by welding.

An inwardly extending die lip support 30 is disposed on a shoulder 32 of core 28 and appropriately secured thereto as by welding. An inner die lip section 34 is disposed on support 30 and is accurately positioned thereon by shoulder 36 formed integrally with support 30 and ring 38. Screws 40 removably secure the inner die lip section 34 to support 30.

The outer surface of the inner die lip section 34 is disposed in predetermined spaced relationship with the inner surface of the outer die lip section 44 to provide an annular die orifice 46 therebetween. The outer die lip section 44 is removably secured by screws 48 to an upper die cup section 50 and is accurately positioned thereon by means of a flange 52 adapted to cooperate with the upper outer peripheral edge of upper cup section 50.

A lower cup section 56 is secured to upper cup section 50 by means of screws 58 and is positioned in place by means of positioning element 60 cooperating with the spider spokes 22 as indicated at 62 in Figure 3. Screws 66 secure the lower cup member 56 in position and to the die holder 18.

The lower surface 70 of upper cup section 50 and the upper surface 72 of lower cup section 56 are shaped to receive a rotatable cup section 76 therebetween. Positioning stops 78 of upper cup section and shoulder 80 of lower cup section cooperate with flanges 79 and 81 respectively of section 76 to accurately position rotatable cup section 76 in place.

The outer peripheral surface of rotatable cup section 76 is provided with teeth 84 which in the form shown are adapted to cooperate with three equidistantly spaced pinions 86, each of which is individually mounted on a separate shaft 88. Each shaft 88 is separately connected through a universal joint 90 to one end of a telescoping shaft 92. The opposite end of telescoping shaft 92 is connected through a universal joint 94 to one of the three output shafts 96 of the speed reducer 98, the input shaft 100 of which is directly coupled to motor 102.

As shown in Figure 3, core 28 and cup sections 50, 56 and 76 are concentric and the inner surfaces of the upper cup section 50 and the lower cup section 56, as well as that of the rotatable cup section 76 are disposed in spaced relationship with respect to the outer surface of core 20 to provide a passage free of parting elements and through which the tubular thermoplastic composition will pass to and be extruded from annular orifice 46.

As shown in Figure 3, the inner smooth surface 110 of rotatable cup section 76 is convex, and the spacing between it and the core 28 opposite thereto is less than the spacing between the core 28 and upper and lower cup sections respectively. This not only causes a change in velocity of the thermoplastic material through that section of the die, but any lines of union not mixed thoroughly are thoroughly mixed by being shifted circumferentially in the die and are not visible when extruded from the die orifice. Thus, when thermoplastic material passes the rotating cup section 76, it is not parted in any way but mixed or homogenized thereby and a uniform and homogeneous mass is delivered to the annular orifice 46.

The rotational speed of the rotatable cup section can vary. In general, satisfactory results are obtained when such cup section is rotated at speeds within the range of approximately 0.2 and approximately 5.0 r.p.m.

In the embodiment shown compressed air is employed to inflate tubing T and it is supplied to the interior of the tubing through the passage 110 which at its outer end is connected to a suitable source of supply, not shown. A valve, also not shown, in the compressed air feed line permits the desired quantity of inflating medium to be introduced.

Compressed air supplied at room temperature is the preferred inflating medium. However, any other gaseous medium, which is inert with respect to the composition being extruded, can be used.

The tubing is withdrawn from the point of extrusion in a substantially vertical direction by a pair of squeeze rolls 112 and 112' disposed in spaced relationship to the die. Squeeze roll 112 is rotatably mounted on shaft 114 in bearings 116 mounted on cross pieces 117 supported by uprights 118. Squeeze roll 112' is rotatably mounted on shaft 114' in bearings 116' mounted on crosspieces 117' supported by uprights 118. Either or both rolls 112 and 112' are driven by conventional means, not shown.

Rolls 112 and 112' also serve to collapse the tubing passing therebetween into a flattened ribbon-like material which is wound up on a torque driven reel, not shown.

It is to be noted that the inflating medium is entrapped or confined by the nips of rolls 112 and 112'. When sheeting is desired, the flattened tubing is slit, as is well known in the art.

To maintain the thermoplastic composition at the desired extrusion temperature, the various components of the die are provided with heating chambers machined so that the heat is transferred through the metal at an even rate circumferentially to all die components, eliminating hot spots which may cause variations in caliper or gauge.

In the form shown in Figure 3, die support 10 is provided with heating chamber 120 having inlet 122 and outlet 124 whereby steam of appropriate temperature is continuously passed therethrough.

Outer die lip 44 is provided with heating chamber 126 to which steam is fed through inlet port 128. It is also provided with an outlet port 130 whereby the steam is continuously fed therethrough.

The heating chamber 132 in inner lip 34 is provided with an inlet port 134 which is connected by line 135 to passage 136 in spider leg to which steam is supplied. Chamber 132 is also provided with an outlet 138 connected to a trap (not shown).

Cup section 50 is formed with heating chamber 140 to which steam is introduced through port 142. An outlet 144 permits exit of the steam so that steam of appropriate temperature will continuously flow through chamber 140.

Cup section 56 is heated by heating chamber 148 to which steam is supplied through supply passage 150. Outlet passage 152 permits steam of appropriate temperature to be continuously supplied to chamber 150.

Cup 28 is provided with heating chamber 154 to which steam is supplied through inlet 156. Port 158 permits exit of the steam from chamber 156 and supplies it to chamber 160 in distributor cone 24. A syphon 162 connected to outlet 164 permits the flow of the steam from chamber 160 and also removes any condensation which may form.

From the foregoing, it is apparent that when the die is assembled as herein described, the cup sections are concentric to the core and there is no need for subsequent centering with screws or otherwise as now required by prior art dies. By making the die lip sections removable, they can, when desired, be removed and replaced quickly and expeditiously.

Instead of utilizing three pinions for rotating the rotatable cup section as herein specifically described, any other number thereof can be used. When a plurality of pinions are employed, they should be equidistantly spaced along the toothed periphery of the rotatable cup section.

Optimum results are obtained when the homogenization is effected by both increasing the velocity of the mass and shifting the tubular mass circumferentially and, therefore, such method of homogenization is preferred. However, improved results will be obtained when the homogenization is obtained by shifting the mass circumferentially alone.

The invention is particularly suitable for the production of polyethylene film in the form of flattened tubing and in which the wall thickness may be of any desired thickness, such as for example within the range of .0005 to .005 inch, or greater. It can also be utilized in the production of flattened tubing of any melt-extrudable thermoplastic composition.

Though extrusion in an upward direction is preferred, the apparatus can be arranged to extrude in a horizontal or downward direction as desired.

The invention provides an apparatus for producing film free of fusion lines and lines from screens and other parting elements which are in the flow path of the thermoplastic composition to the die orifice. It can be used in any process or with any apparatus for melt extruding of any thermoplastic compositions wherein the thermoplastic is parted and subsequently united before extrusion. It is particularly useful in the blown tube method and apparatus, such as for example, disclosed in U.S. Patent 2,461,975, 2,461,976, and 2,632,206 for the production of polyethylene tubing in the form of flattened tubing of any appropriate wall thickness, such as from about .0005 to .005 inch or more.

Since it is obvious that various changes and modifications may be made in the above description, without departing from the nature and spirit thereof, this invention is not restricted thereto, except as set forth in the appended claims.

I claim:

1. An apparatus for melt-extruding a thermoplastic composition which comprises an extruder, a die holder provided with a passage through which thermoplastic material supplied by said extruder is delivered to a die, a spider disposed on the top of said die holder and having its legs in the flow path of the composition, a distributor on the bottom of the spider cooperating with said die holder to provide an annular passage whereby the plastic composition is formed into a tubular mass said die being disposed on said spider, and having a cup and core in spaced concentric relationship to provide a tubular passage terminating in an annular orifice through which the composition is fed and extruded respectively, a rotating mixing element carried by the cup of said die and positioned in a section of said tubular passage to homogenize the composition to remove fusion lines formed in the plastic after passage between the spider legs as it flows thereby in its passage through said tubular passage and before it is extruded through said annular orifice, said die holder and distributor having means for heating the plastic, and means to supply a gaseous inflating medium through the die holder and into the interior of the tubular mass upon emerging from the annular orifice.

2. An apparatus as set forth in claim 1 wherein the homogenizing means comprises a rotatable element having a smooth peripheral surface circumferentially shifting the mass contacting it and means to continuously rotate said rotatable element.

3. An apparatus as set forth in claim 1 wherein the homogenizing means comprises a rotatable element having a smooth convex peripheral surface to contact the flowing composition and means to continuously rotate said rotatable element.

4. An apparatus for melt-extruding a thermoplastic composition comprising a die having an annular orifice and a core and a cup in spaced relationship to provide a passage leading to said annular orifice, said cup including a rotatable section having a smooth inner peripheral wall contacting the composition passing thereby and means to continuously rotate said rotatable section said die being provided with means for heating the composition and means for introducing a gaseous inflating medium into the extruded composition as it leaves the annular orifice.

5. An apparatus as set forth in claim 4 wherein the smooth inner peripheral wall is convex and cooperates with the surface of the core opposite thereto to provide a restriction in the passage between the core and cup.

6. An apparatus as set forth in claim 4 wherein the cup comprises a plurality of superimposed sections in which an intermediate section is rotatably mounted.

7. An apparatus as set forth in claim 4 wherein the rotatable cup section is provided with teeth on its outer peripheral wall which cooperate with pinions, each pinion being carried on a separately driven shaft.

8. An apparatus as set forth in claim 4 wherein the core is hollow and its lower end is secured to a spider which in turn is disposed on a die support, and the lower end of the cup is secured to a positioning ring which in turn is secured to said spider and die support, said core and cup being thereby accurately positioned in concentric spaced relationship.

References Cited in the file of this patent

UNITED STATES PATENTS

| | | |
|---|---|---|
| 1,657,132 | Merle | Jan. 24, 1928 |
| 1,845,249 | Derby | Feb. 16, 1932 |
| 1,993,349 | Parkhurst | Mar. 5, 1935 |
| 2,161,908 | Becker | June 13, 1939 |
| 2,345,086 | Becker et al. | Mar. 28, 1944 |
| 2,433,937 | Tornberg | Jan. 6, 1948 |
| 2,676,356 | Becker | Apr. 27, 1954 |
| 2,703,434 | Allan et al. | Mar. 8, 1955 |
| 2,714,744 | Becker | Aug. 9, 1955 |